(12) United States Patent
Lee

(10) Patent No.: US 12,080,026 B2
(45) Date of Patent: Sep. 3, 2024

(54) METHOD AND APPARATUS FOR ESTIMATING POSE

(71) Applicant: Samsung Electronics Co., Ltd., Suwon-si (KR)

(72) Inventor: Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 16/835,602

(22) Filed: Mar. 31, 2020

(65) Prior Publication Data

US 2021/0097716 A1 Apr. 1, 2021

(30) Foreign Application Priority Data

Sep. 26, 2019 (KR) .................. 10-2019-0118690

(51) Int. Cl.
   *G06T 7/73* (2017.01)
   *G06F 17/16* (2006.01)
   *G06T 5/80* (2024.01)

(52) U.S. Cl.
   CPC ............. *G06T 7/74* (2017.01); *G06F 17/16* (2013.01); *G06T 5/80* (2024.01)

(58) Field of Classification Search
   None
   See application file for complete search history.

(56) References Cited

U.S. PATENT DOCUMENTS

| | | | |
|---|---|---|---|
| 9,415,310 B2* | 8/2016 | Martini | A63F 13/5378 |
| 9,661,257 B2 | 5/2017 | Ishikawa et al. | |
| 9,875,545 B2* | 1/2018 | Rhee | G06T 7/337 |
| 9,916,689 B2* | 3/2018 | Rhee | G06T 7/73 |
| 10,026,001 B2 | 7/2018 | Falconer et al. | |
| 10,075,818 B2 | 9/2018 | Le Grand et al. | |
| 10,269,147 B2* | 4/2019 | Jones | G06T 7/579 |
| 10,819,972 B2* | 10/2020 | Li | H04N 13/239 |
| 10,866,427 B2* | 12/2020 | Jung | G06T 7/246 |
| 11,195,259 B2* | 12/2021 | Li | G06T 5/80 |
| 2003/0044048 A1* | 3/2003 | Zhang | G06T 7/80 382/154 |
| 2003/0072483 A1* | 4/2003 | Chen | G06V 10/24 382/154 |
| 2003/0198377 A1* | 10/2003 | Ng | G06T 7/593 382/154 |
| 2008/0267453 A1* | 10/2008 | Avrahami | G06T 7/246 382/103 |

(Continued)

FOREIGN PATENT DOCUMENTS

| | | |
|---|---|---|
| JP | 2017-194591 A | 10/2017 |
| KR | 10-2014-0063851 A | 5/2014 |

OTHER PUBLICATIONS

Bukhari, F., Dailey, M.N. Automatic Radial Distortion Estimation from a Single Image. J Math Imaging Vis 45, 31-45 (2013). (Year: 2013).*

(Continued)

*Primary Examiner* — Gandhi Thirugnanam
(74) *Attorney, Agent, or Firm* — NSIP Law

(57) ABSTRACT

A pose estimation method and apparatus is disclosed. The pose estimation method includes acquiring a raw image before a geometric correction from an image sensor, determining a feature point in the raw image, and estimating a pose based on the feature point.

10 Claims, 13 Drawing Sheets

(56) References Cited

U.S. PATENT DOCUMENTS

| | | | |
|---|---|---|---|
| 2009/0185715 A1* | 7/2009 | Hofhauser | G06V 10/754 382/103 |
| 2010/0214284 A1* | 8/2010 | Rieffel | G06T 17/00 382/154 |
| 2010/0215287 A1* | 8/2010 | Jeon | G06V 10/753 345/157 |
| 2012/0092329 A1* | 4/2012 | Koo | G06V 20/63 345/419 |
| 2013/0279751 A1* | 10/2013 | Bruna | G06F 18/211 382/103 |
| 2013/0335529 A1* | 12/2013 | Engedal | H04N 13/204 348/46 |
| 2014/0037136 A1* | 2/2014 | Ramalingam | G06T 7/73 382/103 |
| 2015/0077573 A1 | 3/2015 | Ishikawa et al. | |
| 2015/0086084 A1 | 3/2015 | Falconer et al. | |
| 2016/0240570 A1* | 8/2016 | Barna | H01L 27/14654 |
| 2017/0309034 A1* | 10/2017 | Mueller | G06T 7/80 |
| 2018/0075620 A1* | 3/2018 | Wang | G06T 7/74 |
| 2018/0077534 A1 | 3/2018 | Le Grand et al. | |
| 2018/0137642 A1 | 5/2018 | Malisiewicz et al. | |
| 2018/0249151 A1 | 8/2018 | Freeman et al. | |
| 2018/0293041 A1 | 10/2018 | Harviainen | |
| 2018/0315221 A1* | 11/2018 | Jones | G06F 18/22 |
| 2018/0350089 A1* | 12/2018 | Evers-Senne | G06T 3/0018 |
| 2019/0102868 A1* | 4/2019 | Beric | H04N 25/61 |
| 2021/0097716 A1* | 4/2021 | Lee | G06F 17/16 |
| 2021/0293939 A1* | 9/2021 | Jo | G01S 7/497 |
| 2021/0407113 A1* | 12/2021 | Tomioka | G06T 5/50 |

OTHER PUBLICATIONS

Wildenauer, H., Micusic, B., Closed form solution for radial distortion estimation from a single vanishing point, https://projet.liris.cnrs.fr/imagine/pub/proceedings/BMVC-2013/Papers/paper0107/paper0107.pdf, p. 1-11, 2013 (Year: 2013).*

K. Josephson and M. Byrod, "Pose estimation with radial distortion and unknown focal length," 2009 IEEE Conference on Computer Vision and Pattern Recognition, 2009, pp. 2419-2426. (Year: 2009).*

Nakano, G. (2016). A Versatile Approach for Solving PnP, PnPf, and PnPfr Problems. In: Leibe, B., Matas, J., Sebe, N., Welling, M. (eds) Computer Vision—ECCV 2016. ECCV 2016. Lecture Notes in Computer Science(), vol. 9907. Springer, Cham. (Year: 2016).*

Z. Kukelova, M. Bujnak and T. Pajdla, "Real-Time Solution to the Absolute Pose Problem with Unknown Radial Distortion and Focal Length," 2013 IEEE International Conference on Computer Vision, 2013, pp. 2816-2823 (Year: 2013).*

Yamazato, Takaya and Shinichiro Haruyama. "Image Sensor Based Visible Light Communication and Its Application to Pose, Position, and Range Estimations." IEICE Trans. Commun. 97-B (2014): 1759-1765. (Year: 2014).*

Fields, John, et al., "Monocular Structure from Motion for Near to Long Ranges", *2009 IEEE 12th International Conference on Computer Vision Workshops, ICCV Workshops*. IEEE, 2009 (pp. 1702-1709).

Pascoe, Geoffrey, et al., "FARLAP: Fast Robust Localisation using Appearance Priors", *2015 IEEE International Conference on Robotics and Automation (ICRA)*. IEEE, 2015 (pp. 1-8).

Li, Tao, et al., "Camera pose estimation based on distorted lines", *2019 IEEE 8th Joint International Information Technology and Artificial Intelligence Conference (ITAIC)*. IEEE, 2019 (pp. 173-179).

Partial European Search Report issued on Oct. 9, 2020 in counterpart European Patent Application. 20177229.0 (15 pages in English).

Garg, Rahul, et al., "Learning Single Camera Depth Estimation using Dual-Pixels," *Proceedings of the IEEE/CVF International Conference on Computer Vision*, Aug. 14, 2019 (pp. 1-19).

Extended European Search Report issued on Jan. 29, 2021 in counterpart European Patent Application No. 20177229.0 (18 pages in English).

Wang, Rui, et al., "Stereo DSO: Large-Scale Direct Sparse Visual Odometry with Stereo Cameras." *2017 IEEE International Conference on Computer Vision (ICCV)*. 2017 (pp. 1-9).

* cited by examiner

Free of distortion    Barrel distortion    Pincushion

METHOD AND APPARATUS FOR ESTIMATING POSE

CROSS-REFERENCE TO RELATED APPLICATIONS

This application claims the benefit under 35 USC § 119(a) of Korean Patent Application No. 10-2019-0118690 filed on Sep. 26, 2019 in the Korean Intellectual Property Office, the entire disclosure of which is incorporated herein by reference for all purposes.

BACKGROUND

Field

The following description relates to a method and apparatus for estimating a pose.

Description of Related Art

Pose estimation of a camera is to determine translation and rotation information of a camera viewpoint that changes dynamically. The application of pose estimation have been increasing, and is applied in many fields, such as, for example, simultaneous localization and map building (SLAM), a mixed reality, an augmented reality, robot navigating, and three-dimensional (3D) scene reconstruction.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of estimating a pose, the method comprising acquiring a raw image prior to geometric correction by an image sensor, determining a feature point in the raw image, and estimating a pose based on the feature point.

The raw image may include an image in which geometric distortion of a lens of the image sensor is not corrected.

The estimating of the pose may include estimating the pose based on a change in the feature point occurring due to geometric distortion of a lens of the image sensor.

The geometric distortion may include one of a barrel distortion and a pincushion distortion of the lens of the image sensor.

The acquiring of the raw image may include acquiring a raw image before the geometric distortion is removed by an image signal processor (ISP) that processes an image captured in the image sensor.

The method may include acquiring a corrected image after the geometric correction on the raw image, and determining a feature point in the corrected image, wherein the estimating of the pose may include estimating the pose based on a change between the feature point of the raw image and the feature point of the corrected image.

The image sensor may be a dual or more-pixel sensor, each pixel of the dual or more-pixel may include photodiodes.

The method may include determining a vector toward a focal plane based on a phase difference acquired from two photodiodes selected from the photodiodes in each pixel of the dual or more-pixel, wherein the estimating of the pose may include estimating the pose based on the vector.

The estimating of the pose may include determining an angle between the focal plane and an object captured based on the vector and estimating the pose based on a change in the angle.

The phase difference may include an intensity difference based on a relative distance between the focal plane and the captured object.

The estimating of the pose may include estimating the pose by applying an optical zoom-related parameter of the image sensor to the vector.

The method may include detecting a plane in the raw image based on the feature point.

The estimating of the pose may include estimating a pose of the image sensor or a mobile terminal including the image sensor.

In another general aspect, there is provided a method of estimating a pose, the method comprising determining, based on a phase difference acquired from two photodiodes selected from photodiodes in each of pixels of a dual or more-pixel sensor, a vector toward a focal plane in the corresponding pixel, and estimating a pose by determining a relative movement change of the dual or more-pixel sensor with respect to the focal plane based on the vector.

The phase difference may include an intensity difference based on a relative distance between a focal plane and a captured object.

The estimating of the pose may include estimating the pose by determining an angle between the focal plane and a captured object based on the vector and determining the relative movement change based on a change in the angle.

The dual or more-pixel sensor may include pixels, each including the photodiodes.

In another general aspect, there is provided an apparatus for estimating a pose, the apparatus comprising a processor configured to acquire a raw image before geometric correction by an image sensor, determine a feature point in the raw image, and estimate a pose based on the feature point.

The processor may be configured to estimate the pose based on a change in the feature point occurring due to a geometric distortion of a lens of the image sensor.

In another general aspect, there is provided an apparatus for estimating a pose, the apparatus comprising an image sensor configured to obtain a raw image, and a processor configured to select a first feature point from the raw image, obtain a corrected image by correcting a geometric distortion of a lens of the image sensor in the raw image, select a second feature point from the corrected image, the second feature point corresponding to the first feature point, and estimate a pose based on a change between the first feature point and the second feature point.

A geometric distortion of the lens of the image sensor may not be corrected in the raw image.

Other features and aspects will be apparent from the following detailed description, the drawings, and the claims.

Figure 1:
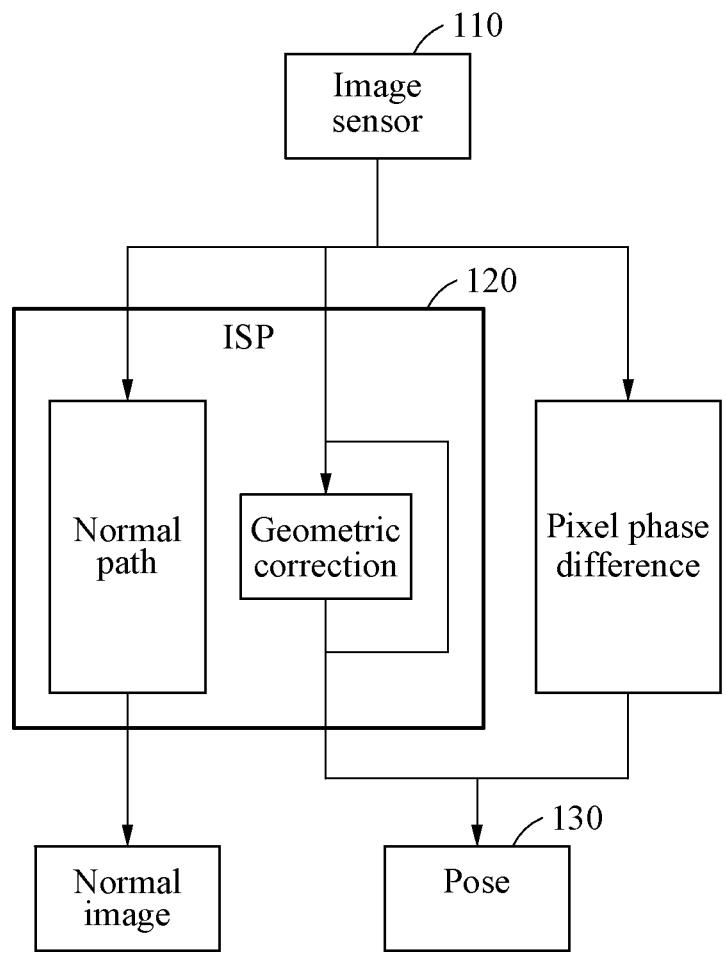
FIG. 1 illustrates an example of a process performed in a pose estimation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 illustrates an example of a process performed in a pose estimation apparatus.

An image sensor 110 generates a raw image by capturing a scene in a field of view (FoV). The raw image may have a geometric distortion occurring due to a lens of the image sensor 110, and thus, may require a process of correcting the raw image like a normal image perceived by a human eye in an image signal processor (ISP) 120. The image that is corrected like the normal image in the ISP 120 is output as, for example, a preview image of the image sensor 110 or a capturing result image of the image sensor 110.

A pose estimation apparatus uses the geometric distortion in the raw image to estimate a pose of the image sensor 110. Correcting the geometric distortion in the ISP 120 is referred to as a geometric correction. A pose estimation is performed using a raw image obtained before the geometric correction. In an example, the pose estimation apparatus estimates a pose using a corrected image obtained after the geometric correction or estimates a pose using images obtained before and after the geometric correction.

In an example, the pose estimation apparatus estimates a pose based on a phase difference acquired from pixels of the image sensor 110. In an example, the image sensor 110 is a dual or more-pixel sensor including pixels, each including a plurality of photodiodes. In the dual or more-pixel sensor each pixel includes two or a plurality of photodiodes.

The pose estimation apparatus estimates a pose at six degrees of freedom (6DOF). In an example, the 6DOF includes three-dimensional (3D) translation and 3D rotation information.

In one example, the pose estimation apparatus is a terminal including the image sensor 110 and is, for example, any terminal such as, for example, a mobile device, a smartphone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart vacuum cleaner, a smart home device, or a security device for gate control, a walking assistance device, a kiosk, a robot, an indoor autonomous robot, an outdoor delivery robot, underwater and underground exploration robots, various Internet of Things (IoT) devices, an autonomous vehicle, an automatic or autonomous driving system, an intelligent vehicle, an unmanned aerial vehicle, an advanced driver assistance system (ADAS), a head-up display (HUD), and an augmented reality head-up display (AR HUD), or any other device capable of wireless communication or network communication consistent with that disclosed herein.

In this example, a pose estimation 130 is performed by a processor, such as, for example, a central processing unit (CPU), a processor core, a multi-core processor, a reconfigurable processor, a multicore processor, a multiprocessor, an application-specific integrated circuit (ASIC), and a field programmable gate array (FPGA), a graphics processing unit (GPU), an application processor (AP), or any other type of multi- or single-processor configuration that is included in the pose estimation apparatus. Further details regarding the processor is provided below.

In an example, the pose estimation apparatus is a device distinguished from a mobile terminal including the image sensor 110 or the image sensor 110, and is a computing device, a remote server, and the like having a high-functional processing ability. In this example, the pose estimation 130 is performed by a computing device, a remote server, and the like that receives a pixel phase difference and/or a raw image acquired by the image sensor 110. For ease of description, the following descriptions will be made for an example in which the pose estimation apparatus is a mobile terminal including the image sensor 110.

Figure 2:
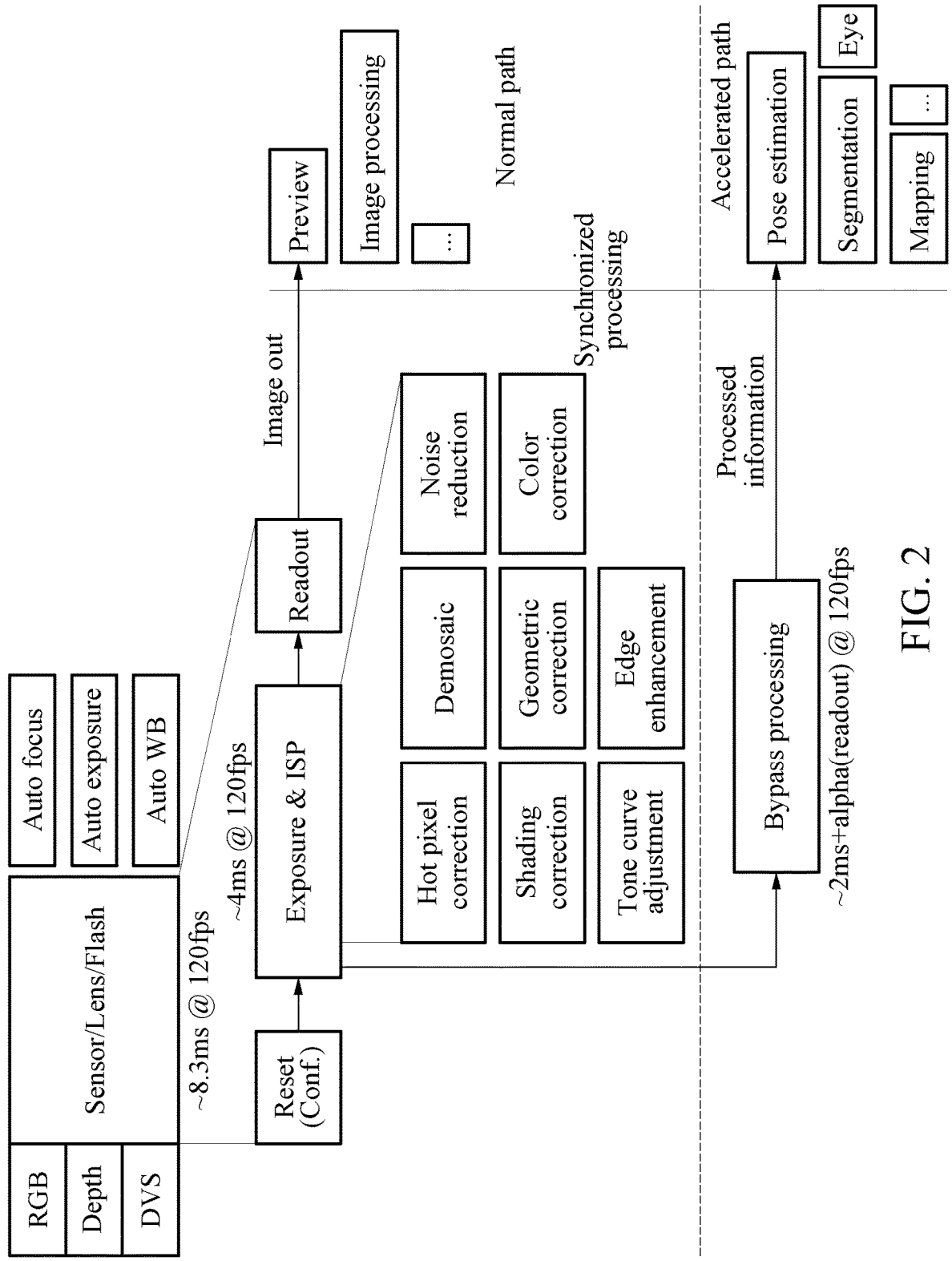
FIG. 2 illustrates an example of processing an image captured in a sensor.

FIG. 2 illustrates an example of a processing an image that is captured in a sensor.

FIG. 2 illustrates a normal path and an accelerated path for processing a raw image in an image signal processor. The normal path is a process in which a raw image captured in a sensor is corrected to an image like a normal image perceived by a human eye through various correction techniques of the image signal processor. The image corrected like the normal image is output as, for example, as a preview image or as a result of capturing an image. The accelerated path does not employ correction techniques of the image signal processor. In the accelerated path, a pose is estimated using a raw image that is captured in a sensor and has a geometric distortion due to a lens. As such, pose estimation is performed using information appearing in the raw image not corrected in the image processor.

Figure 3:
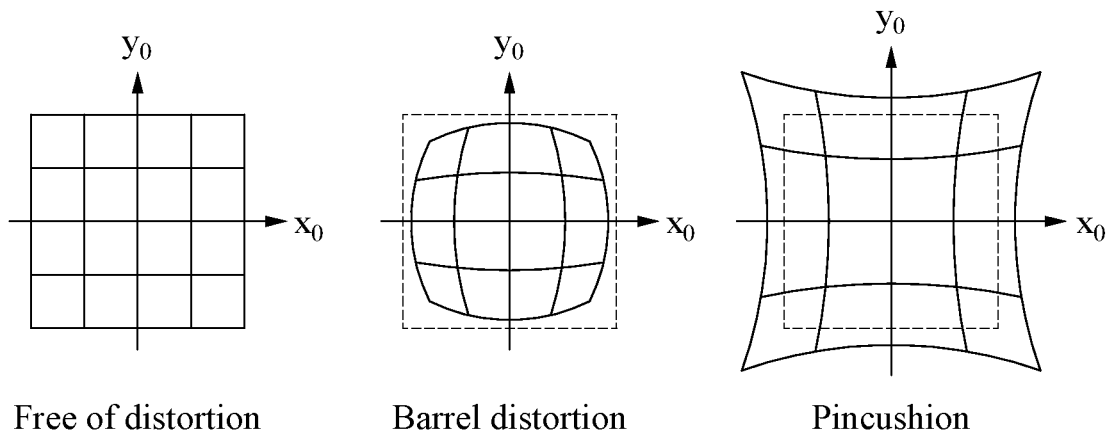
FIGS. 3 and 4 illustrate examples of estimating a pose based on a change in feature point due to a geometric distortion.
Figure 4:
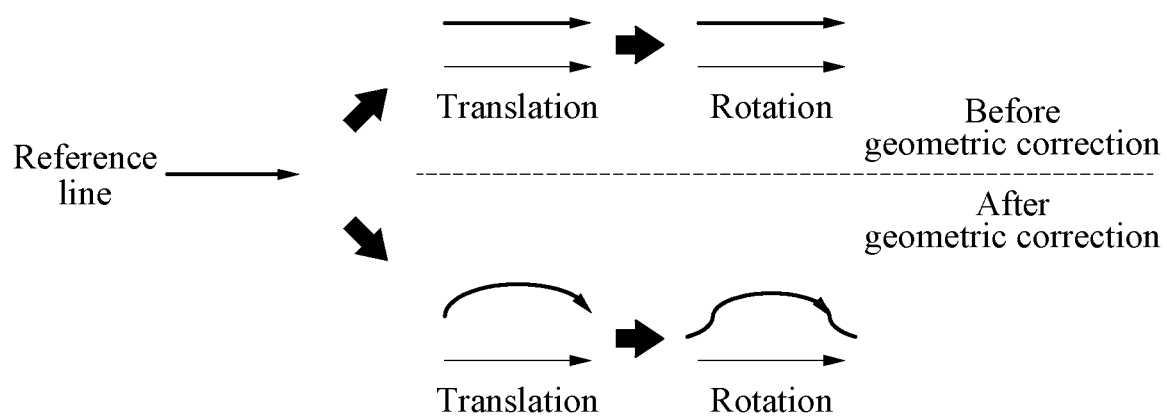

FIGS. 3 and 4 illustrate examples of a process of estimating a pose based on a change in feature point due to a geometric distortion.

FIG. 3 illustrates an example of that is free of distortion, a barrel distortion, and a pincushion distortion.

A raw image captured by an image sensor has a geometric distortion occurring due to a lens of the image sensor. The geometric distortion occurs due to a lens that diffracts light incident onto the image sensor. Also, a degree of the geometric distortion increases as we go closer to a periphery of the raw image. Such geometric distortion differs based on a lens characteristic.

A barrel distortion is a distortion that that happens when straight lines are curved inwards in a shape of a barrel. Commonly seen on wide angle lenses, barrel distortion happens because the field of view of the lens is much wider than the size of the image sensor and hence it needs to be "squeezed" to fit. In barrel distortion, an image magnification decreases as a distance from an optical axis increases. The barrel distortion appears as a form curved like a circle as being closed to a periphery. As illustrated in FIG. 3, it can be shown that a horizontal line in a middle of the raw image with barrel distortion is a straight line while other horizontal lines are curved like a circle as being closed to an upper or lower periphery. Similarly, it can be shown that vertical lines are curved like a circle as being closed to a left or right periphery.

Pincushion distortion is a lens effect that causes images to become pinched in the center, such as the effect on a pincushion as a pin is pushed into it. In a pincushion distortion an image magnification increases as a distance from an optical axis increases. Commonly seen on telephoto lens, the pincushion distortion appears as a form curved in a direction opposite to that of the barrel distortion. As illustrated in FIG. 3, it can be shown that a horizontal line in a middle of the raw image with pincushion distortion is a straight line while other horizontal lines are concaved toward a center of the image as being closed to an upper or lower periphery. Similarly, it can be shown that vertical lines are concaved toward the center of the image as being closed to a left or right periphery.

Such geometric distortion characteristics are used to estimate a pose and related description will be made with reference to the following drawings.

FIG. 4 illustrates an example for explaining a process of estimating a pose based on a change in feature point occurring due to a geometric distortion. In the example of FIG. 4, it is assumed that an image sensor has a movement of rotating after translation and a barrel distortion occurs in a raw image. Also, in FIG. 4, it is assumed that the feature points determined for the reference line are not separately displayed, but the feature points for detecting translation and/or rotation of the image sensor are appropriately determined.

In an example, a change in feature point due to a translation/rotation in a corrected image after a geometric correction is described. The corrected image is an image where the geometric distortion is corrected in an image signal processor. Since the position change of the reference line due to the movement of the image sensor may be detected in the corrected image, the movement of the image sensor may be estimated. In contrast, a change in the reference line due to a rotation of the image sensor is not detected in the corrected image. Thus, the rotation of the image sensor is not estimated using the corrected image.

In another example, a change in feature point that occurs due to a translation/rotation in a raw image before a geometric correction is described. The raw image is an image obtained before a geometric distortion is corrected in an image signal processor. When a reference line located in the middle of the raw image is moved to a periphery of the raw image due to a movement of an image sensor, geometric distortion may occur in the reference line. When a position of the reference line in the raw image is changed due to a rotation of the image sensor, a geometric distortion may occur in the reference line. Thus, a movement of the reference line appears differently in the raw image, which may be used as information available for pose estimation.

In other words, changes of feature points extracted from the raw image may be used as additional movement information that may not be acquired from a typical corrected image. Thus, an accuracy of the pose estimation may be improved using a small number of feature points.

Figure 5:
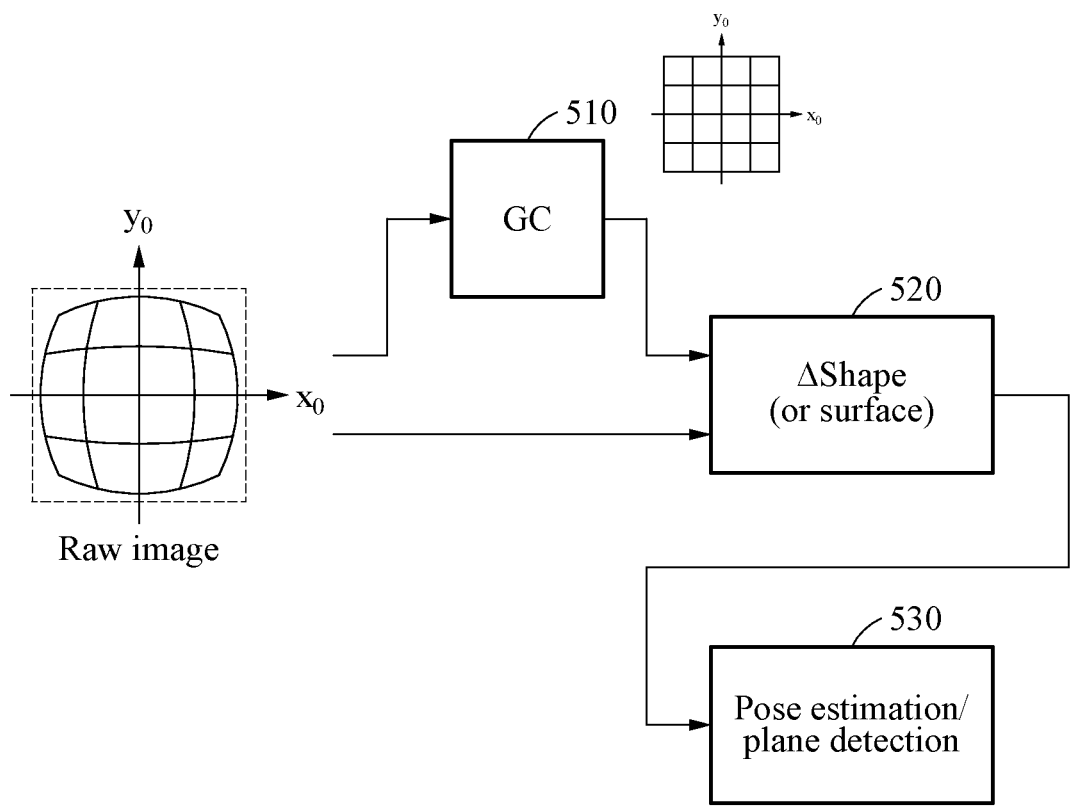
FIG. 5 illustrates an example of a pose estimating and/or plane detecting operation.

FIG. 5 illustrates an example of a pose estimating and/or plane detecting operation.

FIG. 5 illustrates an example of a process for performing pose estimation and/or plane detection using images obtained before and after geometric correction.

In operation 510, a geometric distortion in a raw image is removed through a geometric correction (GC), so that a corrected image is generated.

In operation 520, a shape and/or surface difference between the raw image and the corrected image is determined. For example, the same object may have different shapes and/or surfaces in the raw image and the corrected image based on the presence or absence of geometric correction. Furthermore, feature point changes of the corresponding object appearing in the raw image and the corrected image due to translation and/or rotation of the image sensor may be different from each other.

In operation 530, a pose is estimated based on the difference that is sensed in operation 520. Also, a plane in the image is detected based on the difference that is sensed in operation 520. The plane in image is used, for example, when a virtual object is augmented in an augmented reality (AR).

In addition, since the operations described with reference to other drawings are also applicable to the plane detection and/or tracking, repeated description will be omitted.

Figure 6:
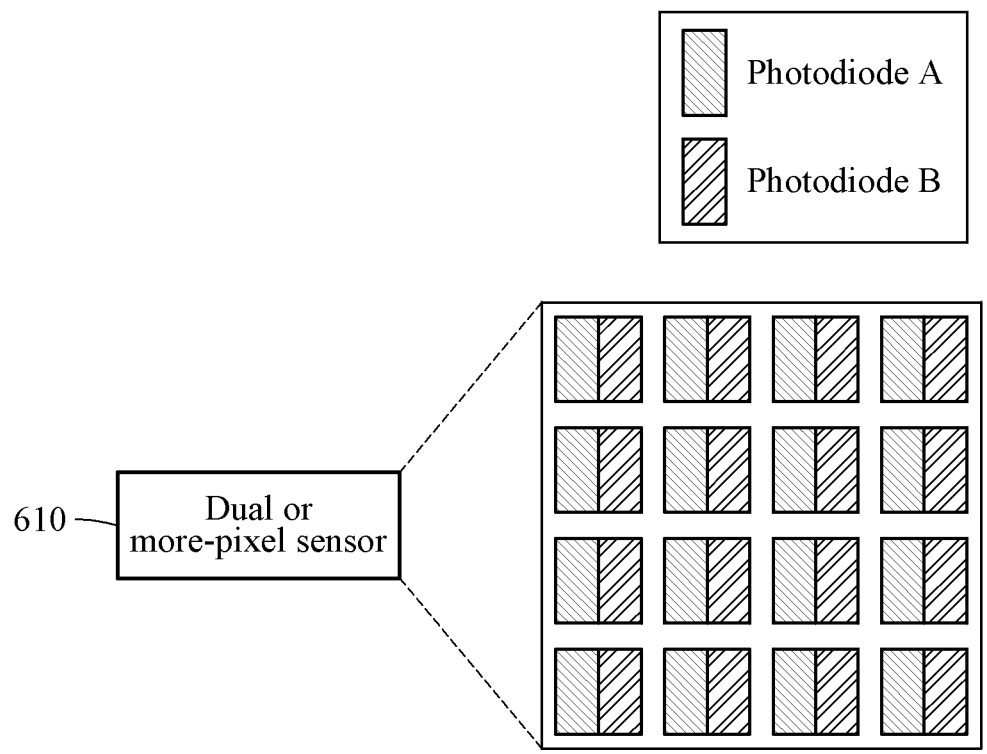
FIGS. 6 through 8 illustrate examples of estimating a pose using a phase difference acquired from two photodiodes selected from a plurality of photodiodes in a pixel.
Figure 7A:
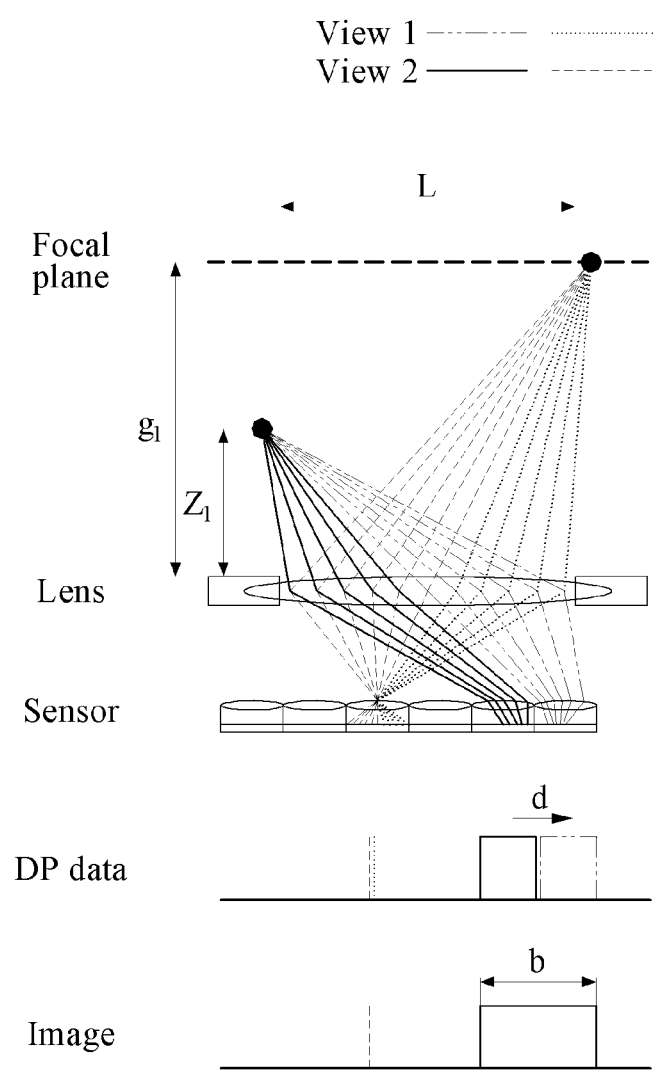
Figure 7B:
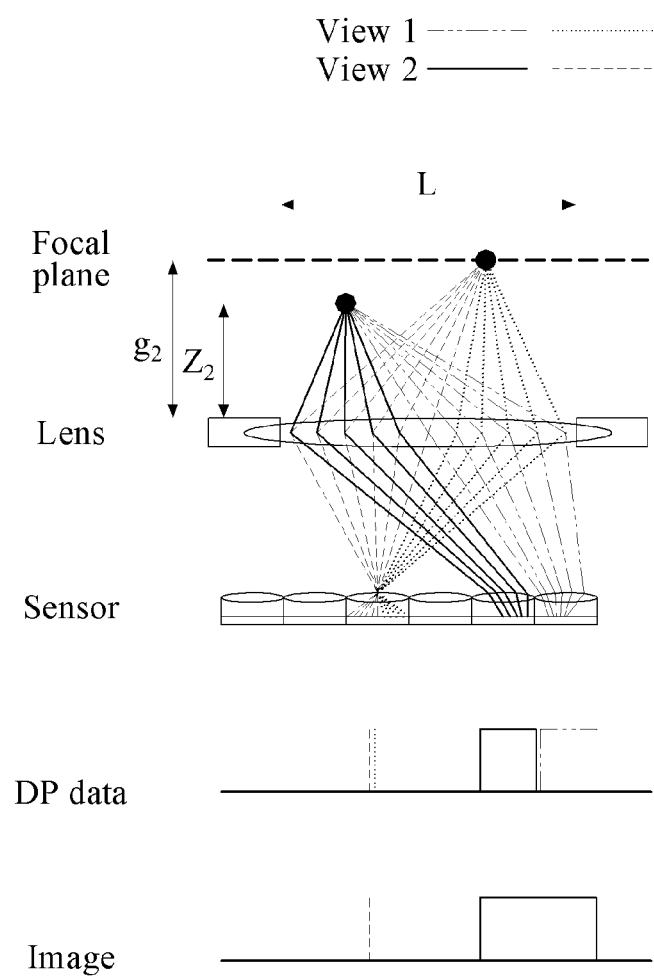
Figure 8:
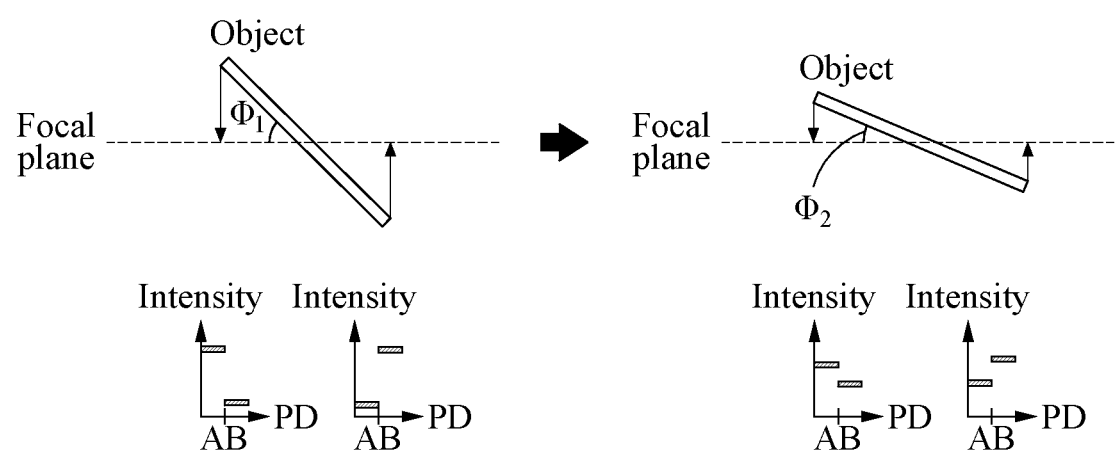

FIGS. 6 through 8 illustrate examples of a process of estimating a pose using a phase difference acquired from two photodiodes selected from a plurality of photodiodes in a pixel.

The above-described image sensor may be a dual or more-pixel sensor 610. FIG. 6 illustrates an example of a structure of the dual or more-pixel sensor 610. In an example, the dual or more-pixel sensor 610 is a single camera including pixels, each including a plurality of photodiodes. Such a single camera has an advantage in fast focusing. In the example of FIG. 6, a photodiode A and a photodiode B are two photodiodes selected from a plurality of photodiodes included in each pixel. Each of the photodiodes A and B independently receives light energy and outputs electric energy (for example, DP data). When capturing an image, a plurality of photodiodes included in each pixel or the two photodiodes A and B selected from the plurality of photodiodes included in each pixel may be used together to capture the image.

FIGS. 7A and 7B illustrate examples for a process of capturing a raw image in a dual or more-pixel sensor.

In an example, a position of a focal plane is determined based on a distance between a lens and a sensor. In an example, a characteristic of the lens is also be considered. An object located on the focal plane is collected at one point of a sensor so that blurriness is not generated. Whereas, an object that is not located on the focal plane is distributed at the sensor, which may cause blurriness.

Referring to FIG. 7A, since an object at a distance $Z_1$ from a lens is not located on a focal plane, it can be seen from DP data output from two photodiodes, selected from the plurality of photodiodes, that a disparity d and a blurriness b is present in an image generated during capturing. In another example, since an object that is located at a distance $g_1$ from the lens is located on the focal plane, a disparity or a blurriness does not exist.

Referring to FIG. 7B, since an object located at a distance $Z_2$ from a lens is not located on a focal plane, it can be known from DP data output from two selected photodiodes that a disparity d and a blurriness b is present in an image generated during capturing. In another example, since an object that is located at a distance $g_2$ from the lens is located on the focal plane, a disparity or a blurriness does not exist.

In the examples of FIGS. 7A and 7B, even though the objects are located at different positions, the same disparity and blurriness are generated. In this regard, although it is difficult to acquire absolute depth information of the object based on a phase difference acquired from two selected photodiodes in each pixel, but it is possible to know the relative depth information on the object with respect to a reference plane. Through this, a short time-section movement change is detected in a short range and used for pose estimation. Detailed description will be made further with reference to FIG. 8.

FIG. 8 illustrates an example of a process of determining information on a relative movement change with respect to a focal plane.

For ease of description, it is assumed that a dual or more-pixel sensor capturing a static object is translated (moved) and/or rotated. In each pixel included in the two photodiodes A and B selected from the plurality of photodiodes of the dual or more-pixel sensor, an intensity difference based on a relative distance between an object and a focal plane is generated. For example, in pixels that sense a left end of the object, an intensity difference indicating that a photodiode A has a greater intensity than that of a photodiode B is generated. Also, in pixels that sense a right end of the object, an intensity difference indicating that a photodiode B has a greater intensity than that of a photodiode A is generated. Although FIG. 8 illustrates the intensity differences of the pixels that sense both ends of the object for ease of description, an intensity difference may also be generated in pixels that sense an intermediate portion of the object. Based on the intensity differences generated in the pixels, a vector from the object toward the focal plane is determined for each pair of pixels. Using the determined vectors, an angle $\varphi_1$ between the object and the focal plane is determined.

Also, based on a translation and/or rotation of the dual or more-pixel sensor, an angle between the object and the focal plane may be changed. Likewise, based on an intensity difference generated in two selected photodiodes in each pixel, a vector from the object toward the focal plane may be determined for each pair of pixels. In an example, an angle $\varphi_2$ between the object and the focal plane may be determined using the determined vectors.

In an example, a pose of the dual or more-pixel sensor is estimated by determining a movement vector representing a relative movement of an object in an image based on vectors determined before and/or after the translation and/or rotation of the dual or more-pixel sensor.

The aforementioned intensity difference is also referred to as "phase difference." A phase difference image performs a function as if it is captured using a plurality of narrow base line stereo cameras. Although it is difficult to extract meaningful information from a long range using such phase difference, it is possible to check motion change information relative to a focal plane at a short distance. Thus, a function similar to an inertial measurement unit (IMU) may be utilized without cumulative errors.

Based on the phase difference acquired from each of the pixels described above, vectors from the object toward the focal plane generated for each pair of pixels are converted into movement vectors of a world coordinate system according to Equation 1 below.

$$\begin{bmatrix} v_{1w} \\ \ldots \\ v_{nw} \end{bmatrix} = [M^{w \to f}][M^{f \to f'}][v_{1f'} \ldots v_{nf'}]$$ [Equation 1]

In Equation 1, $v_{nf'}$ denotes a relative movement vector of an $n^{th}$ pixel with respect to the focal plane, $M^{f \to f'}$ denotes a coordinate system change from a previous focal plane to a new focal plane due to an optical zoom (if no optical zoom, "1"), $M^{w \to f}$ denotes a conversion from a focal plane coordinate system to a world coordinate system, and $v_{nw}$ denotes a movement vector of an $n^{th}$ pixel in the world coordinate system.

As such, relative movement information indicating whether a movement is performed to approach or apart from the focal plane, or whether a rotation is performed with respect to the focal plane is acquired based on phase difference information acquired at different times, so that a movement change is identified at a high speed and processing is performed accordingly.

Figure 9:
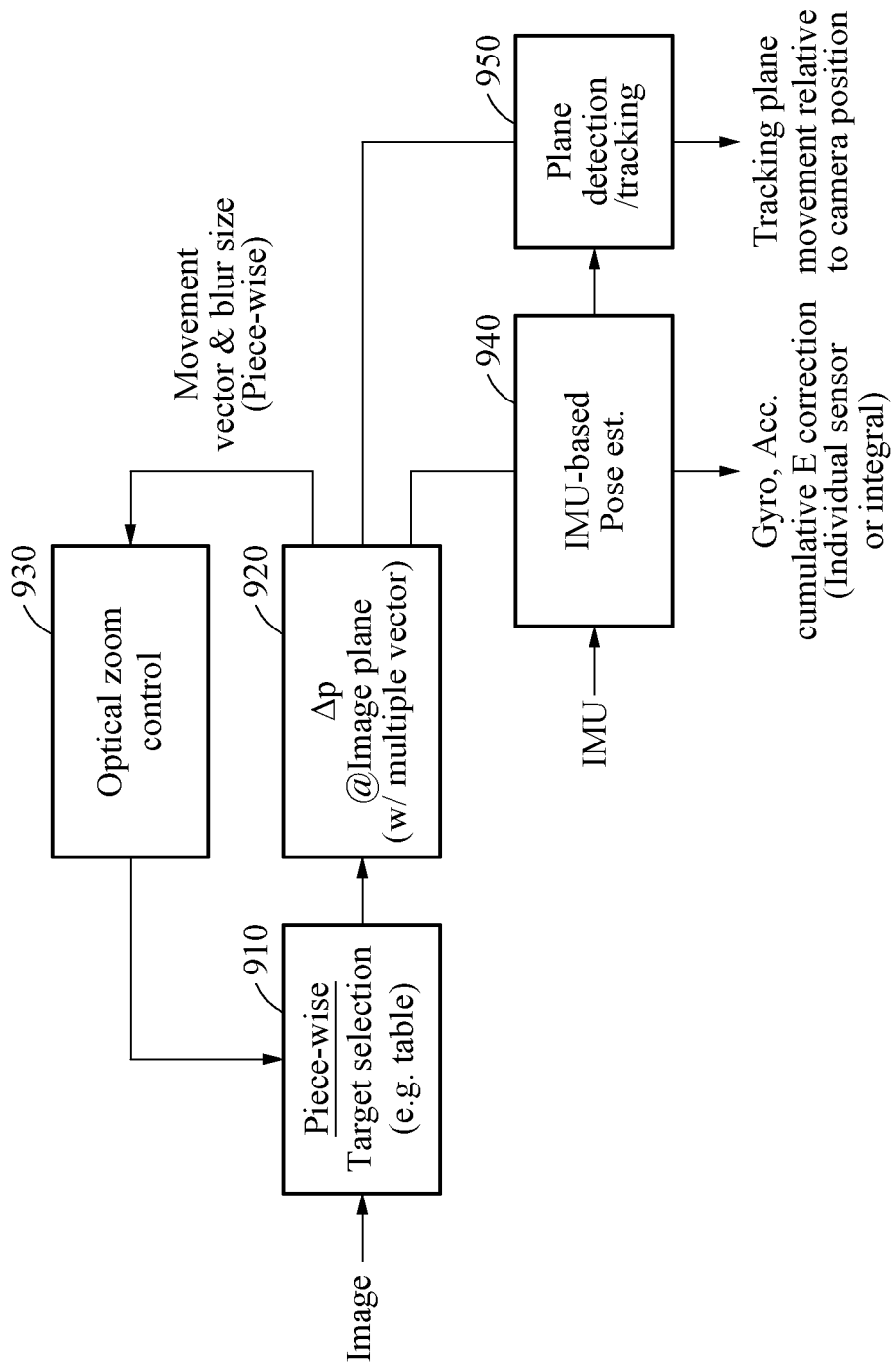
FIG. 9 illustrates an example of a plane detecting and tracking operation.

FIG. 9 illustrates an example of a plane detecting and tracking operation.

FIG. 9 illustrates an example of performing an optical zoom when performing plane detection and tracking using a dual or more-pixel sensor. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, and devices such as a processor, that perform the specified functions, or combinations of special purpose hardware and computer instructions. In addition to the description of FIG. 9 below, the descriptions of FIGS. 1-8 is also applicable to FIG. 9 and are incorporated herein by reference. Thus, the above description may not be repeated here.

In operation 910, a plurality of points included in a single target in an image is selected as piece-wise targets. For example, a predetermined selection point on a table object included in the image is a piece-wise target.

In operation 920, a phase difference acquired from two photodiodes selected from a plurality of photodiodes included in each pixel is determined for a plurality of piece-wise targets. In this case, a vector from a target toward a focal plane is determined for each pixel. For example, when vectors for at least three targets are on the same plane, a target is recognized as a plane. When a target are plural, the target is recognized as a more complex shape.

In operation 930, the optical zoom is controlled based on a movement vector and a blur size. For example, when a change amount is insignificantly sensed due to a small movement vector and/or blur size, the optical zoom is controlled to increase. After the optical zoom is controlled, operation 910 is repeated.

In operation 950, a plane is detected and/or tracked based on the phase difference of operation 920. In this case, a plane movement relative to a camera position may be tracked.

In operation 940, an IMU-based pose is additionally estimated. For example, a value of an additional sensor such as a gyro sensor and an acceleration sensor is used to estimate a pose. Also, information on the estimated pose may be additionally used for the plane detection and/or tracking of operation 950.

In addition, since the operations described with reference to other drawings are also applicable to the plane detection and/or tracking, repeated description will be omitted.

Figure 10:
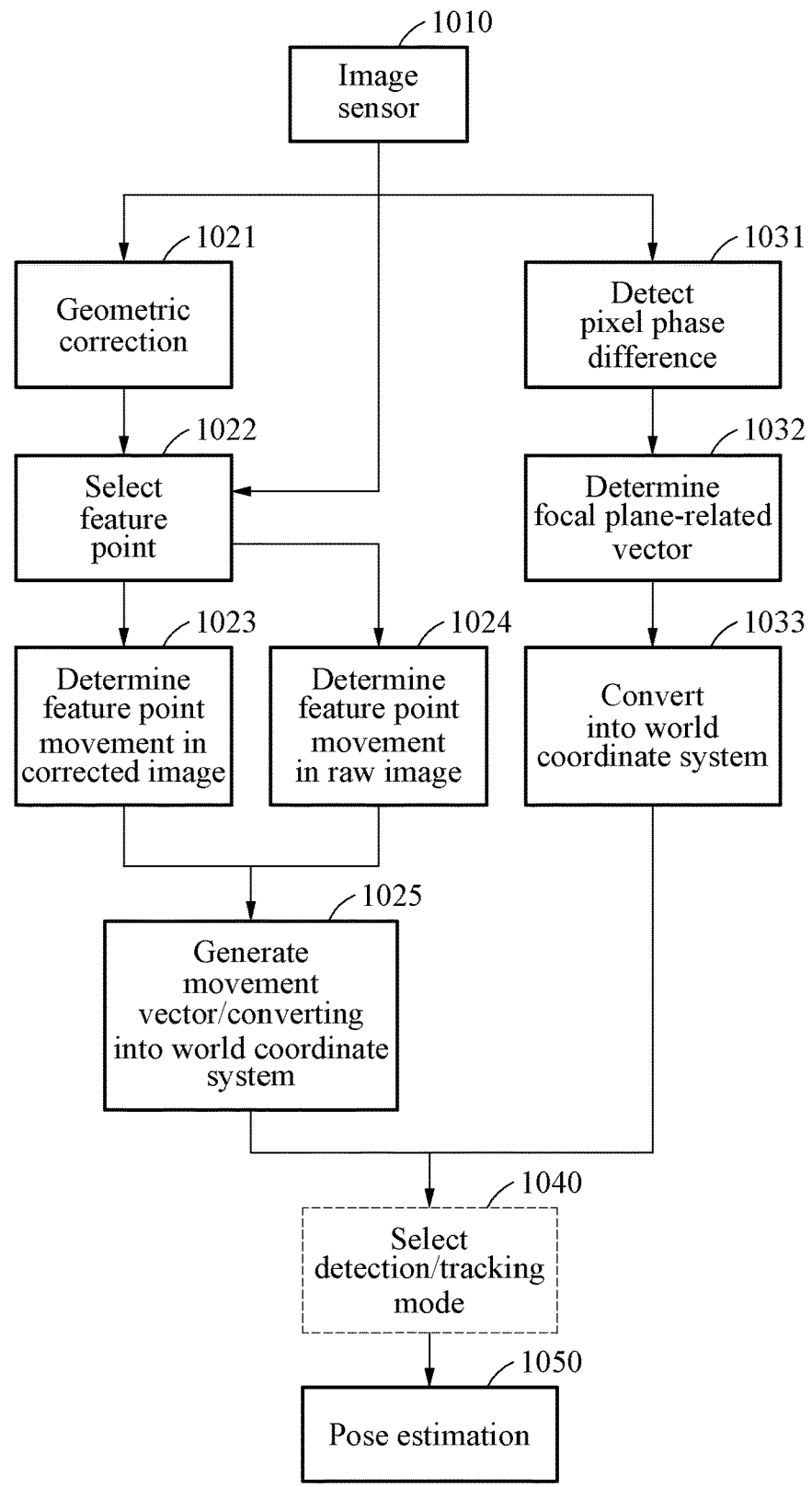
FIG. 10 illustrates an example of a pose estimation process.

FIG. 10 illustrates an example of a pose estimation process. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer, and devices such as a processor, that perform the specified functions, or combinations of special purpose hardware and computer instructions. In addition to the description of FIG. 10 below, the descriptions of FIGS. 1-9 is also applicable to FIG. 10 and are incorporated herein by reference. Thus, the above description may not be repeated here.

FIG. 10 illustrates an example for explaining a pose estimation process that is performed by a processor in a pose estimation apparatus.

In operation 1010, a raw image is acquired from an image sensor. The raw image is an image obtained before a geometric correction at an image signal processor is performed.

In operation 1021, a geometric correction is performed on the raw image, so that a geometric distortion included in the raw image is removed. The geometric distortion occurs due to a lens of the image sensor and includes, for example, a barrel distortion and/or a pincushion distortion. An image obtained by removing the geometric distortion of the raw image is referred to as a corrected image.

In operation 1022, a feature point is selected from the corrected image. For example, the feature point is for performing a SLAM optimization, which may be sparsely or densely selected depending on a computing situation. In an example, the feature point is selected as a point that is easy for identification and matching among random, edge, and texture. In addition, a feature point is also selected in the raw image acquired from the image sensor.

In operation 1023, a feature point movement in the corrected image is determined. In an example, a feature point movement in the corrected image is determined by comparing a corrected image corresponding to a current time point t and a corrected image corresponding to a previous time point t−1. In an example, a final movement is determined by accumulating a movement determined for each time point. In another example, a feature point movement in the corrected image is determined by comparing a corrected image corresponding to a current time point and a corrected image corresponding to a reference time point.

In operation 1024, a feature point movement in the raw image is determined. Unlike the corrected image, a feature point movement in the raw image is determined based on a geometric distortion occurring due to a lens of the image sensor. For example, whether the geometric distortion is a barrel distortion or a pincushion distortion, a degree of distortion of an object located in a periphery in an image are considered.

Like the corrected image, the feature point movement in the raw image is determined by comparing a raw image corresponding to a current time point t and a raw image corresponding to a previous time point t−1. A final movement is determined by accumulating a movement determined for each time point. In another example, a feature point movement in the raw image is determined at a time by comparing a raw image corresponding to a current time point and a raw image corresponding to a reference time point.

In operation 1025, a movement vector is generated based on the determined feature point movements, and converted into a world coordinate system. For example, a movement vector is determined based on a camera coordinate system in which the image sensor is centered, and a coordinate system of the movement vector is converted from the camera coordinate system to the world coordinate system.

In operation 1031, the image sensor is a dual or more-pixel sensor including pixels, each including a plurality of photodiodes, and a phase difference is detected from the two photodiodes selected from the plurality of photodiodes in each of the pixels.

In operation 1032, a vector toward a focal plane is determined using the phase difference detected for each of the pixels.

In operation 1033, a movement vector representing a relative movement is determined based on the vector for the focal plane. Since the movement vector is based on the camera coordinate system, the coordinate system of the movement vector is converted from the camera coordinate system to the world coordinate system.

In operation 1040, a detection and/or tracking mode is selected. The detection mode is a mode in which all or at least a threshold proportion of feature points detected in an image are used. In contrast, the tracking mode is a mode in which a portion, such as below a threshold proportion, of feature points detected in an image is used. For example, it can be confirmed that a pose is changed slightly considering an output value of another sensor such as an IMU. When it is confirmed that a phase difference is changed only for some pixels in operation 1031, the tracking mode is selected such that a pose is estimated based on the phase difference of the corresponding pixels. In some cases, operation 1040 may be omitted.

In operation 1050, a pose is estimated based on the phase difference sensed by the dual or more-pixel sensor and/or the feature point movement change in the raw image and/or the corrected image.

Figure 11:
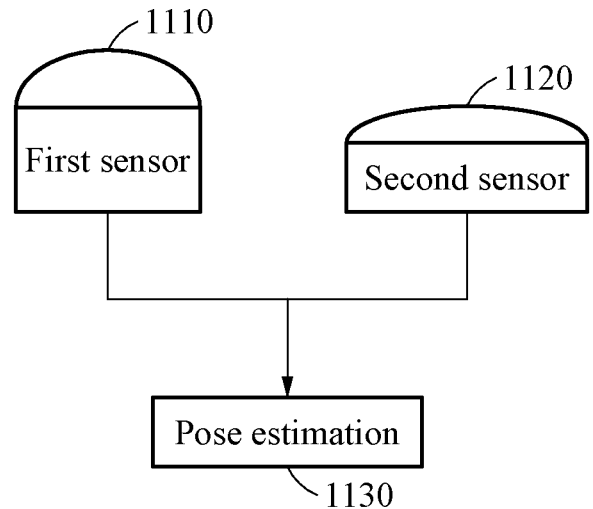
FIG. 11 illustrates an example of a process of estimating a pose using sensors.

FIG. 11 illustrates an example of a process of estimating a pose using a plurality of sensors.

FIG. 11 illustrates an example for explaining a process of estimating a pose using a first sensor 1110 and a second sensor 1120. In an example, the first sensor 1110 and the second sensor 1120 are different from each other and are, for example, an RGB sensor and a depth sensor, a wide-angle sensor and a telephoto sensor, and cameras having different FoVs. Since the first sensor 1110 and the second sensor 1120 are different types of sensors, characteristics of geometric distortions occurring therein are also different. By using such difference between the characteristics of the geometric distortions, an additional feature point that could not be extracted in a typical sensor is considered, which may enable a pose estimation 1130 with increases efficiency. Also, the first sensor 1110 and the second sensor 1120 are different types of sensors, for example, an image sensor and an IMU. The pose estimation 1130 is also performed by integrally considering a feature point movement change in an image acquired in the image sensor and movement information sensed by the IMU.

Figure 12:
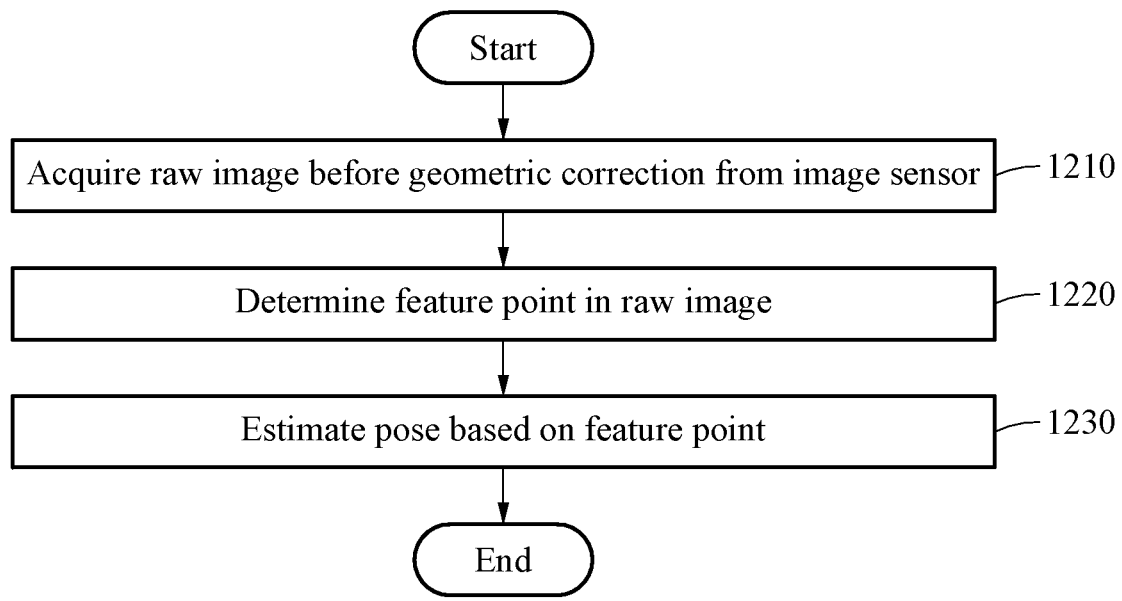
FIGS. 12 and 13 illustrate examples of a pose estimation method.
Figure 13:
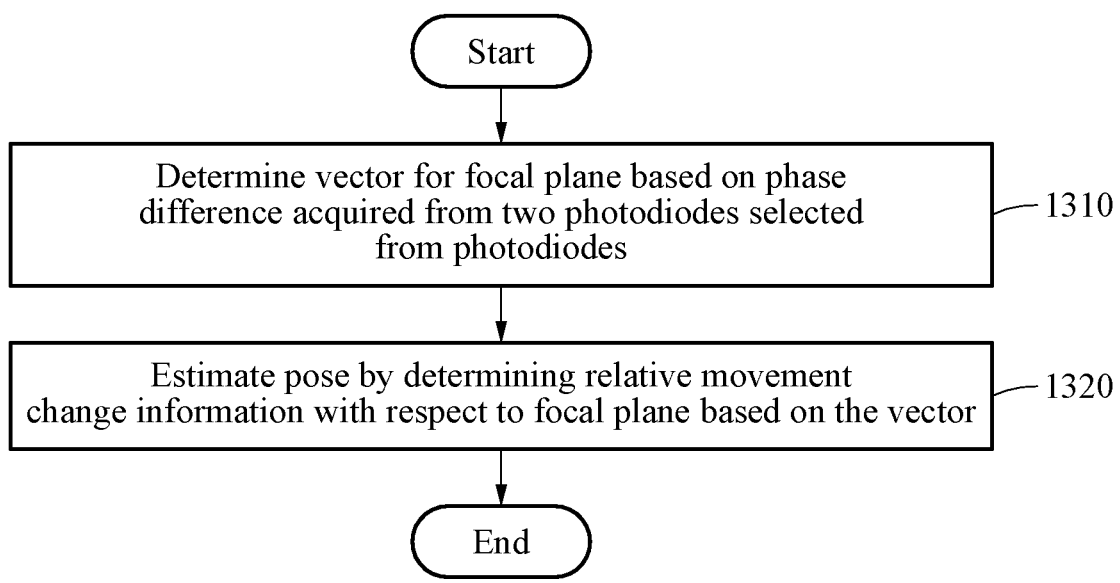

FIGS. 12 and 13 illustrate examples of a pose estimation method. The operations in FIGS. 12 and 13 may be performed in the sequence and manner as shown, although the order of some operations may be changed or some of the operations omitted without departing from the spirit and scope of the illustrative examples described. Many of the operations shown in FIGS. 12 and 13 may be performed in parallel or concurrently. One or more blocks of FIG. 10, and combinations of the blocks, can be implemented by special purpose hardware-based computer, and devices such as a processor, that perform the specified functions, or combinations of special purpose hardware and computer instructions. In addition to the description of FIGS. 12 and 13 below, the descriptions of FIGS. 1-11 is also applicable to FIGS. 12 and 13 and are incorporated herein by reference. Thus, the above description may not be repeated here.

FIGS. 12 and 13 illustrate examples of a pose estimation method performed by a processor included in a pose estimation apparatus.

In operation 1210, the pose estimation apparatus acquires a raw image before a geometric correction from an image sensor. The raw image is an image in which a geometric distortion occurring due to a lens of the image sensor is not corrected. In an example, the pose estimation apparatus acquires a raw image before the geometric distortion is removed in an image signal processor that processes an image captured in an image sensor.

In operation 1220, the pose estimation apparatus determines a feature point in the raw image.

In operation 1230, the pose estimation apparatus estimates a pose based on the feature point. In an example, the pose estimation apparatus estimates a pose based on a change in the feature point occurring based on a geometric distortion due to a lens of the image sensor.

In operation 1310, a pose estimation apparatus determines a vector toward a focal plane in the corresponding pixel based on a phase difference acquired from two photodiodes selected from a plurality of photodiodes in each of pixels of a dual or more-pixel sensor. In an example, the phase difference is an intensity difference based on a relative distance between a captured object and the focal plane. The dual or more-pixel sensor includes pixels, each including a plurality of photodiodes.

In operation 1320, the pose estimating apparatus estimates a pose by determining a relative movement change with respect to the focal plane based on the vector. The pose estimation apparatus may estimate the posture by determining an angle between the captured object and the focal plane based on the vector and determining a relative movement change based on a change in the angle.

Figure 14:
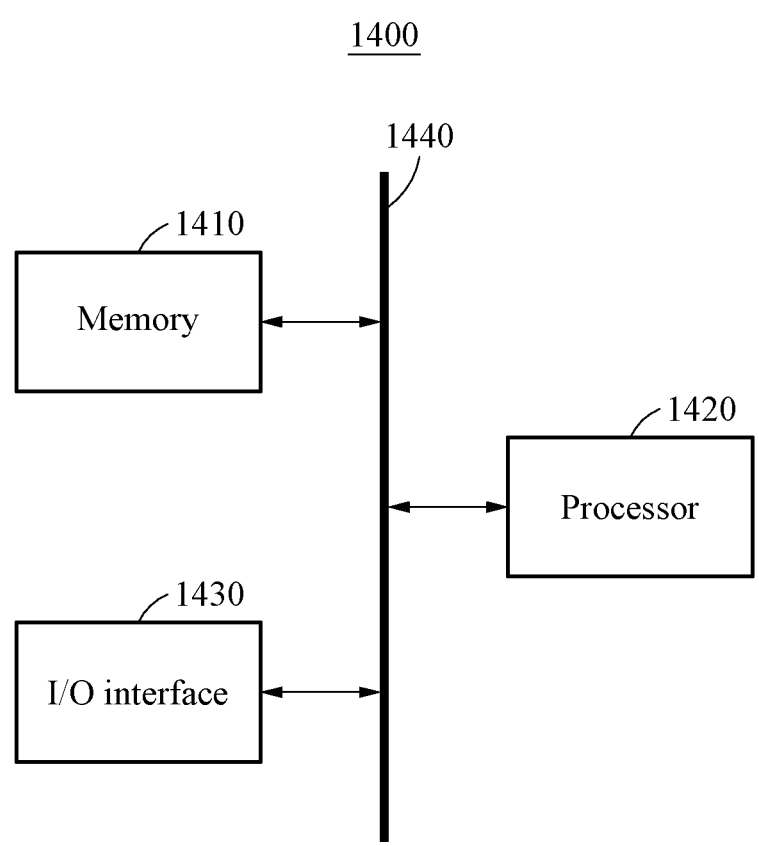
FIG. 14 illustrates an example of a pose estimation apparatus.

FIG. 14 illustrates an example of a pose estimation apparatus.

Referring to FIG. 14, a pose estimation apparatus 1400 includes a memory 1410, a processor 1420, and an input and output (I/O) interface 1430. The memory 1410, the processor 1420, and the I/O interface 1430 communicate with one another through a bus 1440.

The memory 1410 includes computer-readable instructions. The processor 1420 performs the above-described operations in response to the instructions stored in the memory 1410 being executed in the processor 1420. The memory 1410 is a volatile memory or a non-volatile memory. The memory 1410 includes a large capacity storage medium such as a hard disk to store the variety of data. Further details regarding the memory 1410 is provided below.

The processor 1420 is a device for executing instructions or programs, or controlling the pose estimation apparatus 1400. For example, the desired operations include instructions or codes included in a program. For example, the hardware-implemented data processing device includes a microprocessor, a central processing unit (CPU), a processor core, a multi-core processor, a reconfigurable processor, a multicore processor, a multiprocessor, an application-specific integrated circuit (ASIC), and a field programmable gate array (FPGA), a graphics processor unit (GPU), or any other type of multi- or single-processor configuration. Further details regarding the processor 1420 is provided below.

In an example, the pose estimation apparatus 1400 uses the I/O interface 1430 to be connected to another component (e.g., image sensor) in the pose estimation apparatus 1400, be connected to an external device, and perform a data exchange. In an example, the pose estimation apparatus 1400 visually represents an image with the corrected pose on the I/O interface 1430. In an example, the I/O interface 1430 may be a display that receives an input from a user or provides an output. In an example, the I/O interface 1430 may function as an input device and receives an input from a user through a traditional input method, for example, a keyboard and a mouse, and a new input method, for example, a touch input, a voice input, and an image input. Thus, the I/O interface 1430 may include, for example, a keyboard, a mouse, a touchscreen, a microphone, and other devices that may detect an input from a user and transmit the detected input to the pose estimation apparatus 1400.

In an example, the I/O interface 1430 may function as an output device, and provide an output of the pose estimation apparatus 1400 to a user through a visual, auditory, or tactile channel. The I/O interface 1430 may include, for example, a display, a touchscreen, a speaker, a vibration generator, and other devices that may provide an output to a user.

However, the I/O interface 1430 are not limited to the example described above, and any other displays, such as, for example, head-up display (HUD), augmented reality head-up display (AR 3D HUD), and eye glass display (EGD), and computer monitor that are operatively connected to the pose estimation apparatus 1400 may be used without departing from the spirit and scope of the illustrative examples described. In an example, the I/O interface 1430 is a physical structure that includes one or more hardware components that provide the ability to render a user interface, render a display, and/or receive user input.

The processor 1420 acquires a raw image before a geometric correction from an image sensor, determines a feature point in the raw image, and estimates a pose based on the feature point. Also, based on a phase difference acquired from two photodiodes selected from a plurality of photodiodes in each of pixels of a dual or more-pixel sensor, the processor 1420 determines a vector toward a focal plane in the corresponding pixel and a relative change of movement relative to the focal plane based on the vector, thereby estimating a pose.

Using additional movement information that is not to be acquired from a typical geometrically corrected image, it is possible to stably estimate a position/direction using a small number of feature points and reduce a data acquisition time required for signal processing, which enables a fast signal processing.

Also, it is possible to estimate a pose using a minimum quantity of input information by extracting a relatively a large quantity of information from a raw image without need to apply a human visual recognition to a pose estimation apparatus for data processing.

By acquiring additional movement information that is not to be acquired from a typical image, from a phase difference between pixels and/or a raw image before a geometric correction, an effect of estimating a pose using cameras with different characteristics may be achieved using only a single camera.

In addition, the above-described operation may be processed with respect to the pose estimation apparatus 1400.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of estimating a pose. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of estimating a pose, the method comprising:
acquiring a raw image that includes geometric distortion of a lens of an image sensor that obtained the raw image, where the image sensor is a dual or more-pixel sensor having a plurality of pixels, with each pixel of the dual or more-pixel sensor comprising plural photodiodes;
acquiring a corrected image resulting from a performed geometric correction on the raw image;
based on the raw image, determining a vector toward a focal plane for each of multiple pixels, from among the plurality of pixels, based on an intensity difference acquired from two photodiodes selected from the plural photodiodes in each of the multiple pixels; and
estimating a pose based on the determined vectors.

2. The method of claim 1, wherein the geometric distortion comprises one of a barrel distortion and a pincushion distortion of the lens of the image sensor.

3. The method of claim 1, further comprising generating the corrected image by performing the geometric correction on the raw image using an image signal processor (ISP).

4. The method of claim 1, wherein the estimating of the pose comprises:
determining an angle between the focal plane and an object captured in the raw image based on the determined vectors and estimating the pose based on a difference between the determined angle and an angle determined based on other determined vectors, toward the focal plane, with respect to the object captured in another raw image at a different time.

5. The method of claim 1, wherein each of the intensity differences is based on a respective relative distance between the focal plane and a captured object in the raw image.

6. The method of claim 1, wherein the estimating of the pose comprises:
estimating the pose by applying an optical zoom-related parameter of the image sensor to the determined vectors.

7. The method of claim 1, further comprising:
detecting a plane in the raw image based on a determination that a multiple of the determined vectors are on a corresponding same plane.

8. The method of claim 1, wherein the estimated pose is a pose of the image sensor or a mobile terminal including the image sensor.

9. A non-transitory computer-readable storage medium storing instructions that, when executed by a processor, cause the processor to perform the method of claim 1.

10. An apparatus, the apparatus comprising:
a processor configured to:
acquire a raw image that includes geometric distortion of a lens of an image sensor that obtained the raw image, where the image sensor is a dual or more-pixel sensor having a plurality of pixels, with each pixel of the dual or more-pixel sensor comprising plural photodiodes;

acquire a corrected image resulting from a performed geometric correction on the raw image;

based on the raw image, determine a vector toward a focal plane for each of multiple pixels, from among the plurality of pixels, based on an intensity difference acquired from two photodiodes selected from the plural photodiodes in each of the multiple pixels; and estimating a pose based on the determined vectors.

* * * * *